(12) United States Patent
Falck et al.

(10) Patent No.: US 8,750,222 B2
(45) Date of Patent: Jun. 10, 2014

(54) TRANSCIEVER DEVICE FOR ON-BODY AND OFF-BODY COMMUNICATIONS

(75) Inventors: Thomas Falck, Eindhoven (NL); Javier Espina Perez, Eindhoven (NL); Achim Hilgers, Alsdorf (DE)

(73) Assignee: Koninklijke Philips N.V., Eindhoven (NL)

( * ) Notice: Subject to any disclaimer, the term of this patent is extended or adjusted under 35 U.S.C. 154(b) by 358 days.

(21) Appl. No.: 13/146,019

(22) PCT Filed: Jan. 28, 2010

(86) PCT No.: PCT/IB2010/050382
§ 371 (c)(1),
(2), (4) Date: Jul. 25, 2011

(87) PCT Pub. No.: WO2010/086813
PCT Pub. Date: Aug. 5, 2010

(65) Prior Publication Data
US 2011/0280224 A1 Nov. 17, 2011

(30) Foreign Application Priority Data
Feb. 2, 2009 (EP) .................................. 09151872

(51) Int. Cl.
*H04W 4/00* (2009.01)
*H04W 72/12* (2009.01)
*H04W 84/10* (2009.01)
*H04W 88/06* (2009.01)
(52) U.S. Cl.
CPC .......... *H04W 72/1215* (2013.01); *H04W 84/10* (2013.01); *H04W 88/06* (2013.01)
USPC ........... 370/329; 370/335; 370/336; 370/337; 370/338

(58) Field of Classification Search
CPC .................. H04W 72/04; H04W 72/1215; H04W 72/0413; H04W 74/04; H04W 84/10; H04W 88/06
See application file for complete search history.

(56) References Cited

U.S. PATENT DOCUMENTS 7,321,580 B1    1/2008   Ramanathan et al.
2004/0152953 A1    8/2004   Goedeke
(Continued)

FOREIGN PATENT DOCUMENTS

DE   102007003634 B3   4/2008
WO   2008097524 A2   8/2008

OTHER PUBLICATIONS

IEEE Standard for Information Technology Std. 802.15.4: Wireless Medium Access Control (MAC) and Physical Layer (PHY) Specifications for Low-Rate Wireless Personal Area Networks (WPANs); 2006; 323 pages.

*Primary Examiner* — Jae Y Lee (57) ABSTRACT

The present invention relates to a transceiver device for processing a medium access control (MAC) protocol used by a transceiver. The transceiver has a first antenna system for on-body communications and a second antenna system for off-body communications, the transceiver device being designed to reserve one or more data payloads for on-body communications and to allocate the first antenna system to the transceiver for the interval of time occupied by these data payloads, and/or to reserve one or more data payloads for off-body communications and to allocate the second antenna system to the transceiver for the interval of time occupied by these data payloads. An advantageous result of this is that the optimally matched antenna system is available for on-body communications and off-body communications respectively, collisions between data payloads on the radio channel being prevented within the network, and the throughput of data thus being increased and, at the same time, energy consumption being reduced for the transceiver.

19 Claims, 9 Drawing Sheets

(56) References Cited

U.S. PATENT DOCUMENTS

| | | |
|---|---|---|
| 2005/0180385 A1 | 8/2005 | Jeong et al. |
| 2006/0022882 A1 | 2/2006 | Gerder et al. |
| 2007/0060055 A1* | 3/2007 | Desai et al. ............... 455/41.2 |
| 2007/0239229 A1* | 10/2007 | Masoud et al. ............... 607/60 |
| 2007/0280163 A1 | 12/2007 | Zhang |
| 2008/0113621 A1 | 5/2008 | Parthasarathy |
| 2008/0287748 A1 | 11/2008 | Sapounas et al. |
| 2008/0294020 A1* | 11/2008 | Sapounas ............... 600/301 |
| 2010/0195601 A1* | 8/2010 | Zhang ............... 370/329 |

* cited by examiner

TRANSCIEVER DEVICE FOR ON-BODY AND OFF-BODY COMMUNICATIONS

FIELD OF THE INVENTION

The present invention relates to transceiver devices and in particular to transceiver devices having transceivers that provide antenna systems for optimized communications between on-body and/or off-body transceivers. The present invention is suitable in particular, though not exclusively, for use under the standard entitled IEEE 802, Part 15.4: "Wireless Medium Access Control (MAC) and Physical Layer (PHY) Specifications for Low Rate Wireless Personal Area Networks (LR-WPANs)", or that entitled IEEE 802, Part 15.6: "Wireless Medium Access Control (MAC) and Physical Layer (PHY) Specifications for Wireless Personal Area Networks (WPANs) used in or around a body", which standards relate to communications within short-range wireless networks with low transfer rates.

BACKGROUND OF THE INVENTION

Hard-wired sensors for picking up medical or physiological data such as ECGs, SpO2 and blood pressure have long been known. In more recent times, efforts have been devoted to linking sensors of this kind to one another, or to a data sink, without the use of wires or cables by means of a wireless communications network. In the world of those skilled in the art, wireless sensor networks are known by the name of body area networks (BAN). What happens in this case is that physiological data relating to a patient is picked up by a sensor and is transmitted by means of a short-range RF service to a patient monitor situated a short distance away or to a wireless network that is installed in the hospital. What is advantageous in this case is that, as a result of the use of wireless sensors, there are considerably fewer cables for the patient to support on his or her body. In the past, conventional sensors had transmitted their data to a patient monitor via respective cables. Dispensing with this large number of cables gives the patient greater freedom of movement. It is for example easily possible in this way for the patient to get up from his or her bed. However, account has to be taken in this case of the fact that the network needs to supply data to the patient information system with high reliability even in the event of the patient getting up or walking around in the hospital.

Standard IEEE 802.15.4 provides the specifications for a body area network (BAN). This standard describes in particular the physical layer and the medium access control layer of a network of this kind. Under the standard there is specified a communications link in the form of a channel that is divided into superframes. The superframes comprise a plurality of time slots. They begin with and are synchronized by a beacon dataset. The superframes can be subdivided into active and inactive parts, it then being possible for transceiver devices to switch to an energy-saving mode during the inactive part.

The above-mentioned standard describes a short range RF technique and it was developed for typical distances between the transceiver devices of between 0.2 m and 10 m.

For many applications in the field of wireless sensors, a primary consideration is low energy consumption by the transceiver devices. In this way, the present applicant for example is developing a wireless communications system for monitoring the state of health of patients with the help of a plurality of biomedical sensors. A variety of biomedical sensors are linked in to the on-body wireless network. The transceiver devices communicate with one another and with the world around them in order to pick up and transmit data on a patient's state of health. Each transceiver device includes one or more sensors and a processing unit and a communications unit. The communications unit is also referred to in the present text as a transceiver.

The supply of energy to the transceiver device of a network of this kind needs to be ensured, for a number of weeks or months, by means of batteries of as small a type as possible without the need for the batteries to be changed or recharged. The limited amount of energy stored in the battery has to be enough to cover the operation of the sensors, i.e. the picking up of measured values and the communication via the transceiver.

An object underlying the present invention is to specify an arrangement and a process of the kind detailed in the opening paragraph that, by optimizing the conditions of transmission and reception, reduce the amount of energy required to operate the transceiver both in the transmitting mode and in the receiving mode.

In accordance with the invention, this object is achieved by a device of the kind mentioned in the opening paragraph by virtue of the features of claim 1. The invention comprises a transceiver device that processes a medium access control (MAC) protocol of a transceiver. The transceiver has a first antenna system for on-body communications and a further, second, antenna system for off-body communications.

The transceiver device for on-body communications is also able to reserve one or more data payloads and, at this time, to allocate the first antenna system for on-body communications to the transceiver.

Furthermore, the transceiver device is also able to reserve one or more data payloads for off-body communications and, in this interval of time, to allocate the second antenna system for off-body communications to the transceiver.

An advantageous result of this is that optimally adapted antenna systems are available for, respectively, communications close to the body and communications distant from the body. By the assigning of on-body data payloads and off-body data payloads, it is possible to reduce collisions within the network that are caused by non-optimum selection of the antenna systems.

In accordance with the invention, the match between an optimum antenna polar diagram and the rights of use to the channel advantageously produces optimized data throughput on the radio channel. Hand in hand with this there is a reduction in the stress on the patient caused by radio frequency radiation. Another advantageous result is that, because of the optimized way in which the antenna systems of the transceiver device are trained on the destination to which messages are to be transmitted, only low transmitting power is required. What is also an advantageous result is the fact that, because of the optimized granting of rights of use to users on the radio channel, the respective transceivers can be operated, at times, in the energy-saving sleep mode. A more effective use of energy is achieved in this way and this improves the battery-based endurance of the sensors.

What is meant by an antenna system is an arrangement that comprises at least one antenna. However, what may be also present in an antenna system, as well as the antenna, are devices that change the polar diagram of an antenna such for example as switches, relays, attenuators, phase shifters, etc.

The invention also covers a device as specified above in which a network coordinator provides time slots for on-body communications and time slots for off-body communications in a superframe. An advantageous result of this is that, because of the allocation of time slots, less work has to be done to administer the radio channel. The amount of protocol traffic on the radio channel thus goes down and in return the throughput of data goes up.

The invention also makes provision for a device as specified above in which synchronization of the data payloads for on-body communications and/or off-body communications is performed by means of at least one beacon payload that is generated by the network coordinator.

In one embodiment, each transceiver device on the network may request time slots for communications with on-body devices or off-body devices, as the case may be, from the network coordinator, with the network coordinator granting the network users rights of use for time slots, for transmission and reception, by means of a beacon payload. As well as this, the network coordinator may also provide, in a superframe, time slots in the form of contention access periods (CAP) or in the form of guaranteed time slots (GTS), each of these for on-body or off-body communications.

What is meant by contention access is a method of accessing a channel in which each user observes the channel as a receiver and only changes to transmitting when a quiescent pause has occurred, i.e. when a signal from another user is not having to be received onto the channel.

Similarly, what is meant by a contention access period is a period of time in which the above-mentioned method of accessing a channel is being carried out.

What is meant by the assignment of guaranteed time slots (GTS) is a method of accessing a channel in which at least one user is granted an exclusive right to use the channel for the period of time in question.

An advantageous result of this is fewer collisions when access is being sought to the radio channel, because of the guaranteed time slots. There is an increase in the throughput of data due to the granting of guaranteed rights of use for communications between individual transceivers. What is more, all the transceivers do not have to be ready to receive all the time and instead some of the receivers may be operated in the energy-saving sleep mode, the consequence of which is a considerable reduction in the energy consumption of the individual transceivers.

In another preferred embodiment of the invention, a network coordinator that is arranged on-body transmits the beacon payload in parallel by means of the first and second antenna systems.

An advantageous result of this is that any device on the network is able to perform the function of network coordinator and that even devices arranged on-body make provision for optimum emission of the beacon payload.

In a further embodiment, the invention also makes provision for a converter to have the first and at least one other antenna system, with the further antenna system or systems being intended for communications links conforming to a mid range RF link standard.

An advantageous result of this is that a link with the patient's BAN can be established or continuously maintained at any time regardless of where the patient is, i.e. it does not matter whether the patient is in bed or walking round the hospital.

The invention also provides a system for wireless communications between at least one transceiver device, comprising
  transceiver devices arranged on the patient's body,
  transceiving units positioned off-body.

What is meant by a transceiver device is a unit that also includes, as well as a transceiving unit, other functional units such for example as a sensor unit, a display, a processor and a memory but also antennas, switches, measuring, control and regulating devices, etc. Examples of a transceiver device of this kind are a hub, a gateway, a protocol converter, a patient monitor, a sensor, etc.

What is meant by a transceiving unit is a device that generates, conducts, processes or switches radio frequency signals, such for example as a transmitter, a receiver, a transceiver, an antenna switch, a cable, a waveguide, a relay, an electronic circuit, etc.

The invention also provides a system as specified above in which the said system has a transceiver device according to the invention that performs the function of a converter. This converter serves to change data between a radio link standard for on-body/off-body communications to any desired other standard for radio links, and/or it serves to translate between the protocol for on-body or off-body communications and other radio services. If a short range RF link and a mid range RF system link exist simultaneously, this ensures that the BAN is linked into the system redundantly. What is advantageous in this case is that if either of the two links fails or suffers interference or disruptions, whichever is the other link is still available.

The invention also provides a system as specified above in which any transceiver device on the network is able to assume the function of network coordinator, and in which the function of network coordinator is assigned to that transceiver device on the network that is switched on first.

The invention also provides a system as specified above for exchanging data between a sensor that is arranged on a patient and a patient information center, comprising:
  an off-body communications link via a patient monitor, or
  an on-body communications link to a converter and the exchange of data by means of the converter over a mid range RF link made via the third antenna system. An advantageous result of this is that, because the selection of the antenna system is optimized regardless of the RF link, it is guaranteed that behavior in respect of electromagnetic environmental compatibility, energy efficiency and data throughput will be optimum no matter where the patient is.

What is more, the invention also provides a MAC protocol process in which a transceiver device divides a transmission channel into superframes that follow one another in time. The superframes comprise at least a beacon payload, a data payload for on-body communications and a data payload for off-body communications. What is meant by a MAC protocol process is the process of controlling media access in ISO-OSI layer 2. The MAC layer is the second layer from the bottom and comprises network protocols and components that regulate how a plurality of processors apportion the physical transmission medium of which they make shared use.

The beacon payload is generated by the network coordinator. The transmission range for data payloads for on-body communications is from 0 to 20 m, and preferably 0 to 2 m, an antenna system for on-body communications being used during the period of time occupied by the data payloads for on-body communications. The transmission range for data payloads for off-body communications is from 0 to 100 m, and preferably 0 to 15 m, an antenna system for off-body communications being used for this purpose.

The invention also provides a MAC protocol process as specified above in which the MAC protocol process makes provision for a transceiver device as the network coordinator, the network coordinator coordinating the on-body and off-body radio traffic by allocating time slots by means of the beacon payload.

The invention also provides a MAC protocol process as specified above in which each transceiver device divides the superframes into as many intervals of time for data payloads as desired, but preferably into 16 thereof.

In the superframe, one or more data payloads are reserved for on-body communications, the antenna system that is assigned to the transceiver being the first one in this case, and/or one or more data payloads are reserved for off-body communications, the antenna system that is assigned to the transceiver being the second one in this case.

An advantageous result of this is that, because of the allocation of the intervals of time and the allocation of the length of the data payloads, there is great flexibility in the selecting of data throughout, the selecting of the amount of data to be transmitted and the selecting of the time for the measurement of data.

The invention also provides a MAC protocol process as specified above in which a transceiver device serves as a protocol converter, in the form of a hub, bridge, or gateway for example, between the protocol process used in the on-body or off-body communications, as the case may be, and some other protocol process. As well as having the advantages mentioned above, the provision of a protocol converter also has that of making it possible for the most advantageous protocol process for the conversion of data to be selected on a radio service.

BRIEF DESCRIPTION OF THE DRAWINGS

Further embodiments will be described below by reference to the drawings.
In the drawings.

DETAILED DESCRIPTION OF THE DRAWINGS

Figure 1:
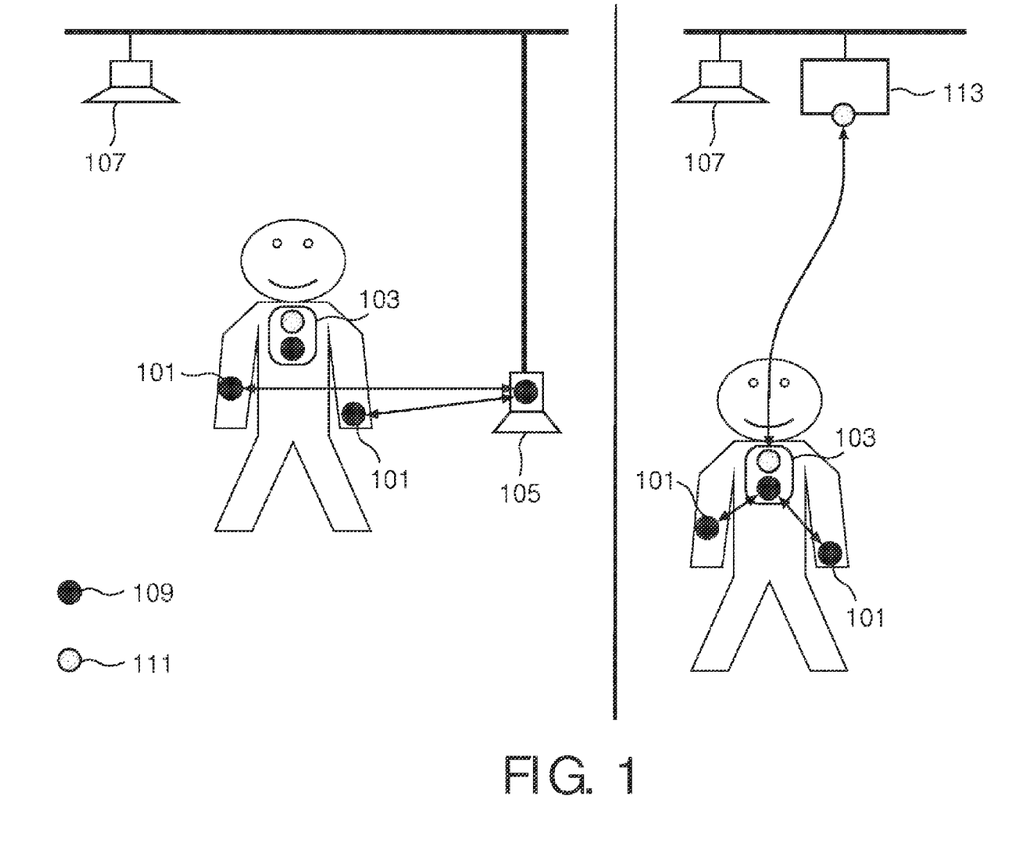
FIG. 1 is a schematic diagram of two versions of a BAN, namely an on-body BAN and an off-body BAN.

A typical application of the present invention is found in what is described in FIG. 1, which shows a body area network (BAN). The sensors 101, 103, which are mounted on the body or are for example bonded to it with adhesive, are used to measure an ECG, the SpO2 saturation and blood pressure and to establish a wireless link to a patient information center 107 and to transmit the data on the patient.

Shown in FIG. 1 are two scenarios that are typical of the use of body area networks. A patient lying in bed is shown on the left-hand side of FIG. 1, and a patient who is up and walking around the hospital is shown on the right-hand side thereof. In the case of the patient lying in bed, transceiver devices are fitted with measuring sensors and with a transceiver operating to IEEE standard 802.15.4. The sensors 101 are directly linked to the patient monitor 105 that is arranged at the bedside. The patient monitor 105 in turn is linked directly to the patient information center 107, which is arranged for example in the room serving as the station for the medical staff.

On the right-hand side of FIG. 1, a transceiver device 103 is provided that serves simultaneously as a collecting center for receiving data from the sensors and as a protocol converter, such as a hub for example. In this embodiment, the sensors first communicate with the protocol converter 103 by means of a short range RF protocol, and the protocol converter 103 then transmits the data, in a mid range RF protocol, via a WLAN for example, to an access point 113, which establishes a wireless link to the patient information center 107.

The wireless pick-up of measured values allows the patient to move about freely, and consequently the need arises for the communications to be distinguished as communications that are on-body and off-body oriented, so that a suitable transmission protocol can be used at all times.

A typical protocol for on-body communications is the short range RF protocol under standard IEEE 802.15.4, which standard is often wrongly referred to as ZigBee. This standard specifies the physical layer and the MAC layer for low rate wireless personal area networks. Under this standard, a transceiver device assumes the role of network coordinator. In the present embodiment it is the first device that is switched on the network that is the network coordinator. The network coordinator is responsible for organizing the data traffic between the individual users of the network. This tasks comprises, on the one hand, dividing the radio channel into time slots, the time slots being short intervals of time in which data is exchanged at the transmitting and receiving ends, in which case access to the channel can be granted by following different rules, such for example as ones giving guaranteed or non-guaranteed rights of access. The network coordinator defines the division of the radio channel into the superframe structure in accordance with the present standard IEEE 802.15.4. What this means is that the network coordinator emits a beacon payload as a synchronizing signal and in this way presets the time-based structure of, preferably, 16 time slots. What is meant by a data payload is a number of bits that is treated as a unit when transported. The data payload is preferably so designed that its duration is of the same length as that of a time slot. The beacon payload is, at the same time, a synchronizing signal and the carrier of the configuring information for the radio channel. A superframe comprises 16 intervals of time that are preferably all of the same length and that may be occupied by data payloads. The data payloads may be marked as active data payloads or as non-active or inactive data payloads in this case. What is mean by an active data payload or an active interval of time is that the data payload or the interval of time constitutes a period in which all the users on the network are ready to receive or transmit and can be switched to transmit or receive as dictated by the commands shown in the beacon payload. The term inactive data payload or inactive time slot means that devices on the network are switched to the energy-saving sleep mode during this time, the transmitter and/or receiver of the transceiver device being switched off.

Figure 2A:
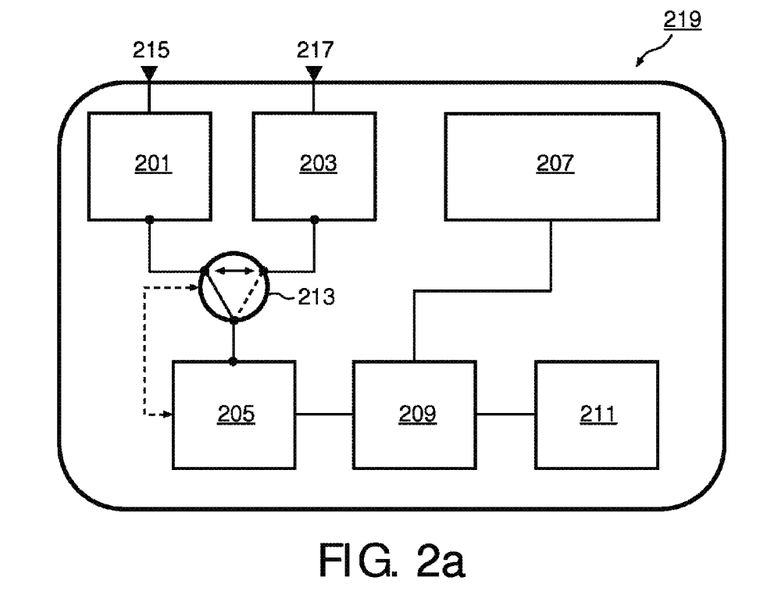
FIG. 2a shows an embodiment of system architecture for a transceiver device.
Figure 2B:
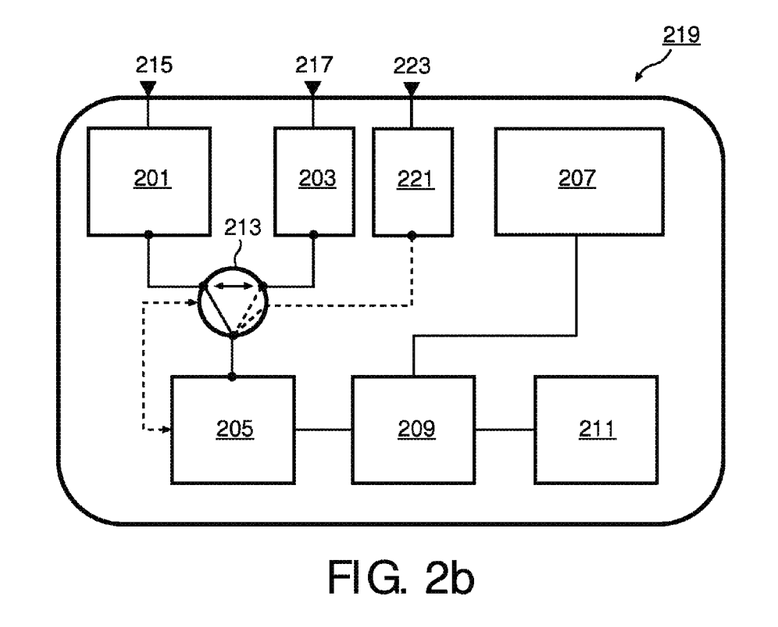
FIG. 2b shows an alternative embodiment of system architecture for a transceiver device.

An embodiment of transceiver device according to the present invention is shown in FIG. 2a. The device comprises a radio frequency (RF) transceiver 205 in which a first antenna system 201 for on-body communications and a second antenna system 203 for off-body communications can be allocated to the transceiver 205 by means of a switch 213 or some similar, suitable, device. In the present embodiment this process is controlled by the transceiver. In other embodiments however the allocation may also be controlled by some other unit, such as a processor 209 for example. The transceiver device 219 also comprises a processor 209, a memory 211 and a sensor 207 for picking up measured values. In one embodiment, the transceiver device 219, comprising a transceiver 205, a switching device 213, a first antenna system 201 and a second antenna system 203, may take the form of a patient monitor 105 or the form of a hub 103. In an alternative embodiment that is shown in FIG. 2*b* the transceiver device 219, when in the form of a hub or protocol converter 103, may also comprise one or more transceivers or more than two antenna systems 201, 203, 221. The basic idea is that of being able to switch between an antenna system 201 for on-body communications and an antenna system 203 for off-body communications, thus, in many cases, enabling an optimized receiving or transmitting polar diagram to be available for the transceiver 205.

Figure 3:
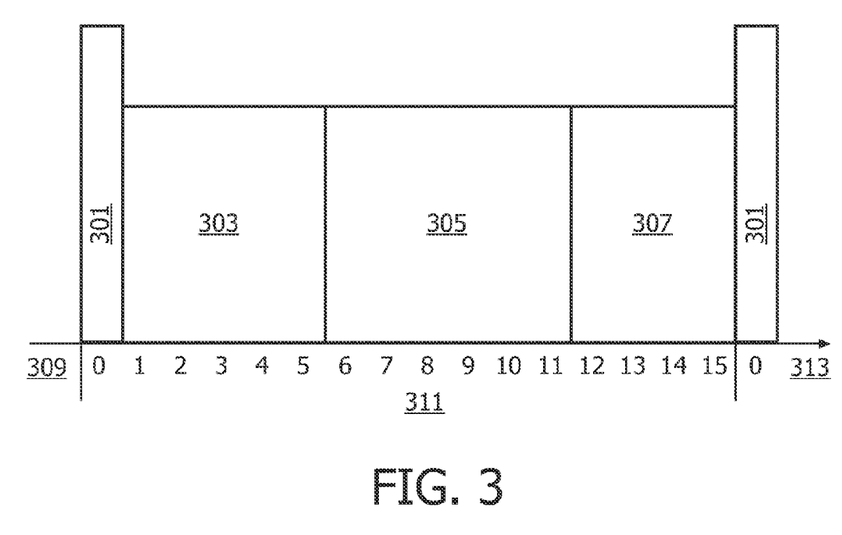
FIG. 3 shows an embodiment of superframe.

FIG. 3 shows a superframe 311, having individual time slots 309 that are intended for on-body 303 and off-body 305 communications. By means of the beacon payload 301, the coordinator notifies the network users how the structure of the superframe is configured and which time slots are intended to be an inactive period 307 or to be periods 303, 305 for on-body and off-body communications. During the times that are intended for on-body communications 303, all the transceivers 205 on the network that are arranged on-body use the first antenna system 201 for on-body communications, whichever antenna system this may be in the given case, whereas during the times that are intended for off-body communications 305 all the transceivers 205 on the network have recourse to the second antenna system 203 for off-body communications, whichever one this may be in the given case. During the times that are marked as an inactive period 307, all the devices go into the sleep mode, in which the transceivers 205 are deactivated for example, which means that the current consumption of the transceiver devices 219 is only very low.

Figure 4:
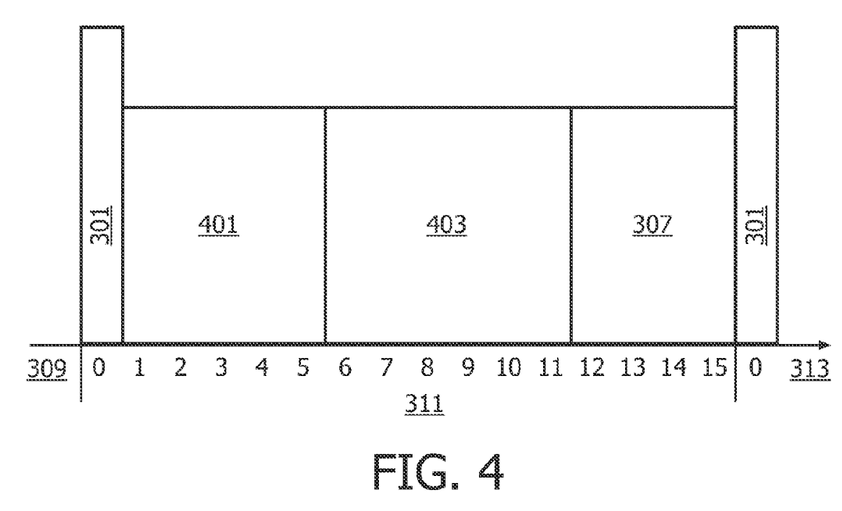
FIG. 4 shows a further embodiment of superframe.

Shown in FIG. 4 is a new superframe structure 311 according to the present invention. In this structure provision is made for what are termed contention access periods (CAP) 401, 403 that are designed for on-body communications and off-body communications respectively. During the on-body CAP 401, only sensors arranged on-body are allowed, in competition or contention, to obtain for themselves the right to use the channel, and in this way are allowed to communicate with one another. To prevent collisions on the radio channel, the body sensor checks, before it transmits, whether the medium, i.e. the radio channel, is free (listen-before-talk, CSMA/CA). A similar process is performed in the case of off-body CAPs 403, it being made possible in this case for the sensors arranged on-body to communicate with off-body devices, and conversely it being made possible for off-body devices to establish links to the sensors arranged on-body. The listen-before-talk principle is applied in this latter case too. The CAPs are preferably designed for irregular, isolated or intermittent communications because the radio channel is shared with other wireless systems, with all the users accessing the channel on the listen-before-talk principle to prevent them from interfering with one another.

Figure 5:
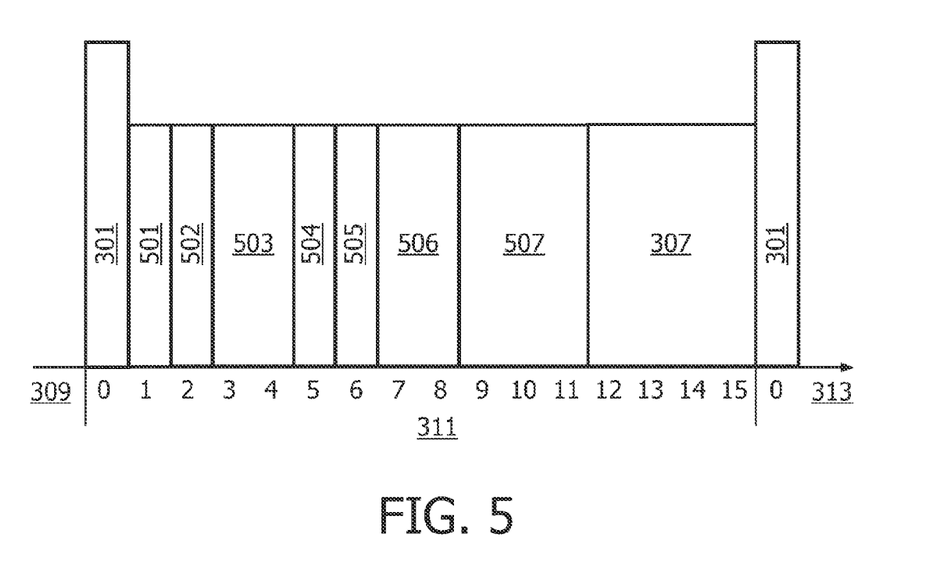
FIG. 5 shows a further, alternative embodiment of superframe.

In FIG. 5 is shown an embodiment of the division, by time, of the superframe into guaranteed time slots (GTS) 501, 502, 503, 504, 505, 506, 507. An advantageous result of this is that when the radio channel is being accessed the probability of collisions is only low due to the use of a network coordinator. The throughput of data is also increased by the means, which has the known effects as far as the reduction of energy consumption is concerned. For example, during the guaranteed time slot GTS1 501 for on-body communications the body sensor A gets in touch with the body sensor B, in which case the device A uses the entire time slot GTS1 501 for the targeted emission of packets to the device B without observing the listen-before-talk rule. Provision is made in the embodiment for a similar eventuality in which an off-body device intends to communicate with another off-body device by means of guaranteed time slots (GTS) 505, 506, 507. The GTS are intended for communications between users that make regular exchanges of data. The assignment of GTS is intended to prevent collisions with other users whose exchange of data traffic is irregular but which operate on the same frequency channel.

Figure 6:
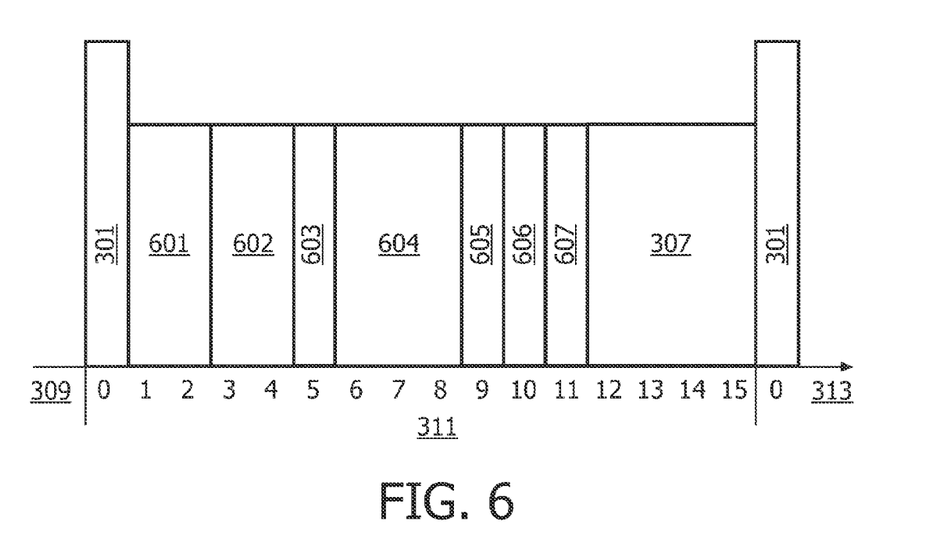
FIG. 6 shows an alternative embodiment of superframe.

FIG. 6 shows an embodiment of the superframe structure 311. The superframe structure begins with the network coordinator's beacon payload 301. The beacon payload contains commands relating to the way in which the superframe structure 311 is divided up. The active period of the superframe structure 311 comprises CAP (contention access period) time slots 601 for on-body communications and CAP time slots 604 for off-body communications and also GTS (guaranteed time slot) time slots 602, 603 for on-body communications and GTS time slots 605, 606, 607 for off-body communications.

Figure 7:
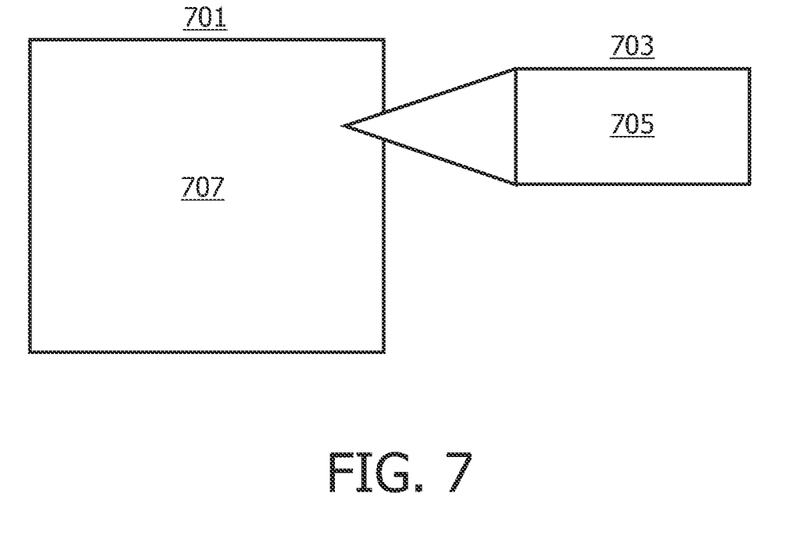
FIG. 7 is a schematic representation of the request for a time slot.

The method of reserving time slots is shown in FIG. 7. To allow time slots for off-body communications and on-body communications by means of CAPs and GTS to be allocated, time slots can be reserved at the network coordinator. For this purpose, a device transmits parameters for specifying the communications requirements by means of a guaranteed time slot specification (GTS spec) 703, for example the number of time slots required, the transmitting address and receiving address 705, to the network coordinator in the form of a time slot request (TS request) 701.

Figure 8:
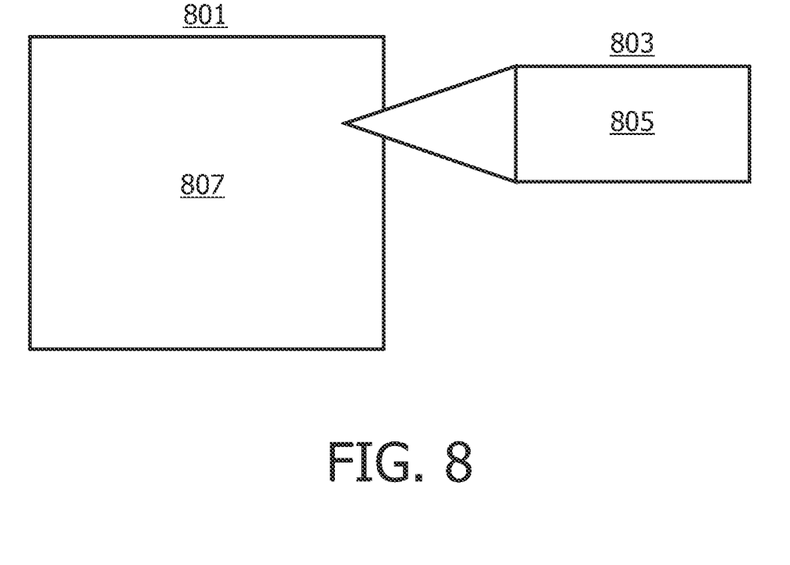
FIG. 8 shows the assignment of a time slot in a superframe.

FIG. 8 shows the content of the beacon payload transmission (superframe spec) 801 that, on the basis of the guaranteed time slot request (GTS request) 803, is transmitted to the network coordinator for off-body and on-body communications by means of CAPs and GTS. The network coordinator informs the network users of the superframe structure that applies at the time. One embodiment comprises the transmission of a beacon payload in which is stored a list 807 that comprises the sequence in which the time slots occur, details of the addressee and the recipient of data payloads, orientation in the form of on-body or off-body orientation, whether the right to transmit is given by CAP or GTS, whether a period is active or inactive and the duration.

Figure 9:
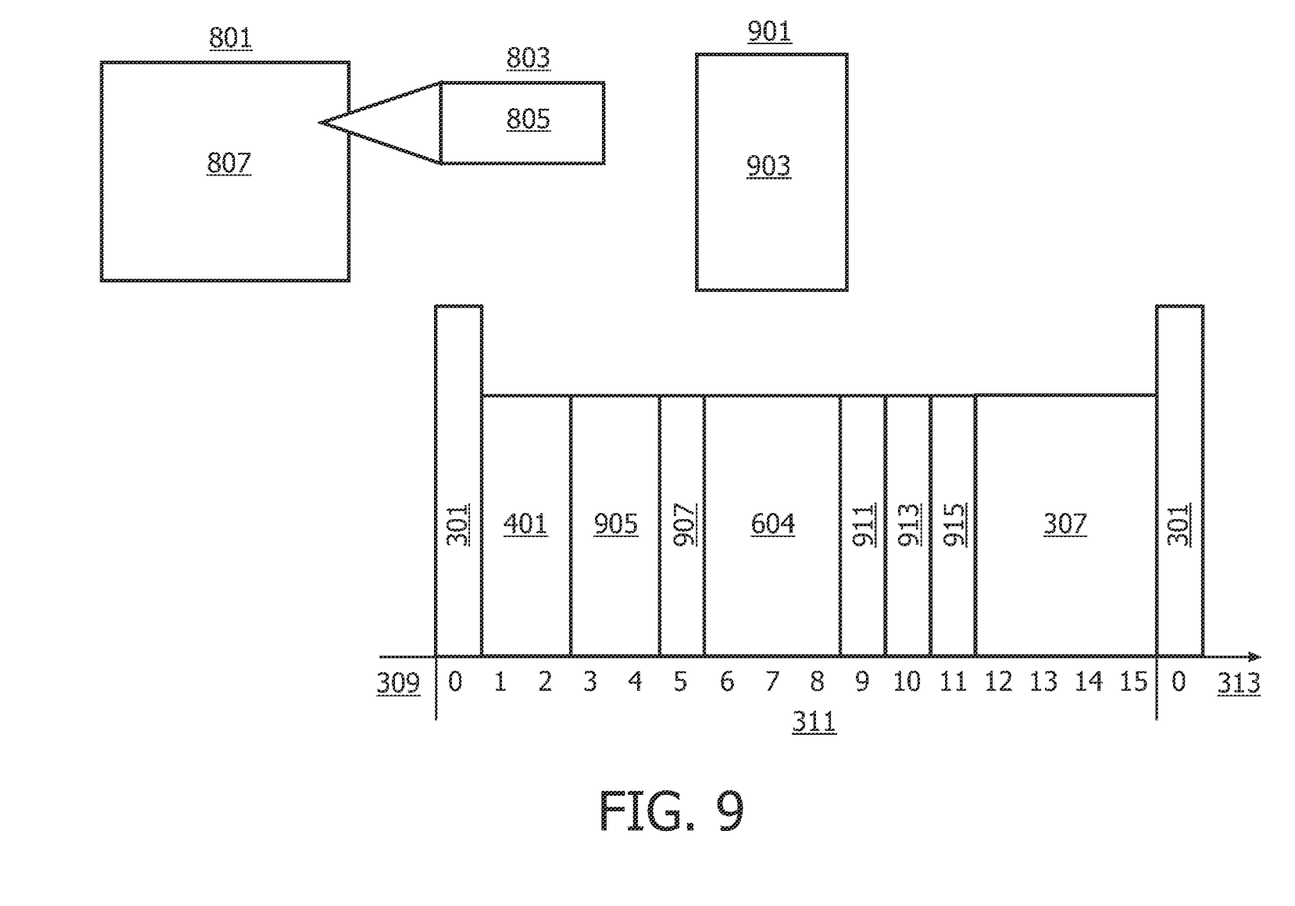
FIG. 9 shows an embodiment of beacon payload in relation to a superframe.

FIG. 9 shows a detailed, combined example of a division into time slots. The beacon payload 801 to give the superframe specification (superframe spec) comprises the items of data 807: time slot duration (in microseconds), number of on-body CAP time slots, number of on-body GTS time slots, specifications of the individual GTS time slots, number of off-body CAP time slots, number of off-body GTS time slots, specifications of the individual off-body GTS time slots and number of inactive time slots. The request 803 for guaranteed time slots (GTS spec), which is sent to the network coordinator to be made known generally in the beacon payload 801, contains the data 805 relating to the number of time slots, to the transmitter address and to the receiver address and in the case of transmission the beacon payload 901 contains the specifications of the superframe in the form of, for example columns of data and numbers 903 giving the parameters. In line with what is preset by the beacon payload, the superframe is then put together in the form shown in the bottom part of FIG. 9.

By means of a superframe that is emitted by the network coordinator, the content of the beacon payload notifies all the devices, by reference to the information given in the beacon payload, of when on-body and off-body communications are taking place. Working from this, the transceiver devices in turn allocate the transceivers an antenna system for on-body communications, that is characterized in that the antenna system has an omnidirectional polar diagram that is oriented particularly in the longitudinal direction of the human body, or an antenna system for off-body communications that is characterized in that the antenna system has a polar diagram that points away from the human body.

In a preferred embodiment in which the function of network coordinator is performed by an on-body device, the beacon payload is transmitted in parallel by means of the first antenna system for on-body communications and also by means of the second antenna system for off-body communications.

Figure 10:
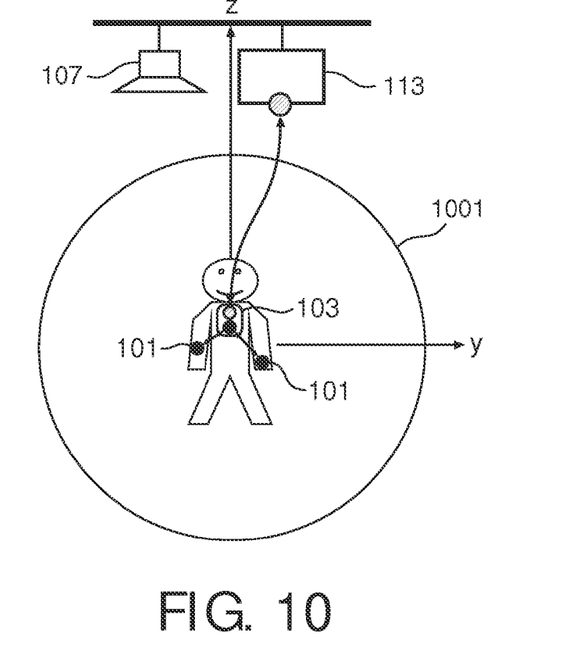
FIG. 10 shows a polar diagram for on-body communications.

FIG. 10 describes a preferred polar diagram for antenna systems for on-body communications. An antenna system of this kind preferably has an omnidirectional polar diagram 1001. In one embodiment, the polar diagram is intended to be oriented particularly in the longitudinal direction of the human body. An omnidirectional polar diagram of this kind is produced by, for example, a single dipole or a single monopole antenna if the said antenna is so arranged that the direction in which it is of the longest extent is oriented, at the point at which it is located, perpendicularly to the surface of the human body. However, it is also possible for other antenna orientations or antenna devices that have a suitable polar diagram to be used as antennas or strip antennas, such for example as slotted antennas or printed circuit board antennas. Basically, the intention is for the antennas to be so arranged that, together with the transceiver or separately therefrom, they have a polar diagram that is close to the polar diagram 1001 shown in FIG. 10.

When there is an optimized polar diagram and on the assumption that the distance between the transmitters and receivers is generally small, the radiated power can be reduced to a very low level of transmitted power. Also, the transmitted power for on-body communications can be lower than the transmitted power for off-body communications, whereby the reduction in adverse effects, particularly on the human body, is optimized.

Figure 11:
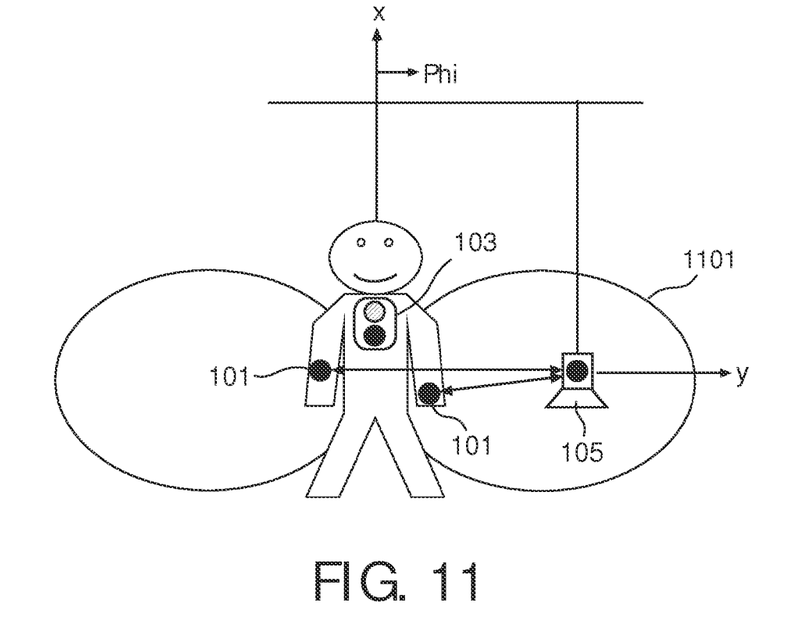
FIG. 11 shows a polar diagram for off-body communications.

FIG. 11 shows an embodiment of an antenna diagram 1101 for off-body communications. What are suitable in the embodiment of a transceiver and antenna system for off-body communications are high operating frequencies that have a low depth of penetration into the human body. Low frequencies that have a comparatively high depth of penetration into the human body and, connected therewith, strong capacitive coupling-in are not suitable for mid range or long range communications links. By the placing of the antenna in a suitably determined position either on the transceiver or in the transceiver device 101, the hub 103 or a protocol converter 103, or the like, the intention is for the polar diagram 1101 to be so oriented that a transceiver arranged off-body from the patent, such as a patient monitor 105 for example, can be reached by a directed polar diagram. A patch antenna is able to emit a directed polar diagram oriented off-body when the longitudinal extent of the antenna, relative to its foot point, is arranged parallel to the surface of the human body. Because a higher transmitted power is used for off-body communications in comparison with on-body communications, a strip antenna arrangement or a patch antenna is preferably used. This makes it possible for the human body to be shielded against high levels of transmitted power because strip antenna arrangements have a directed polar diagram.

Figure 12:
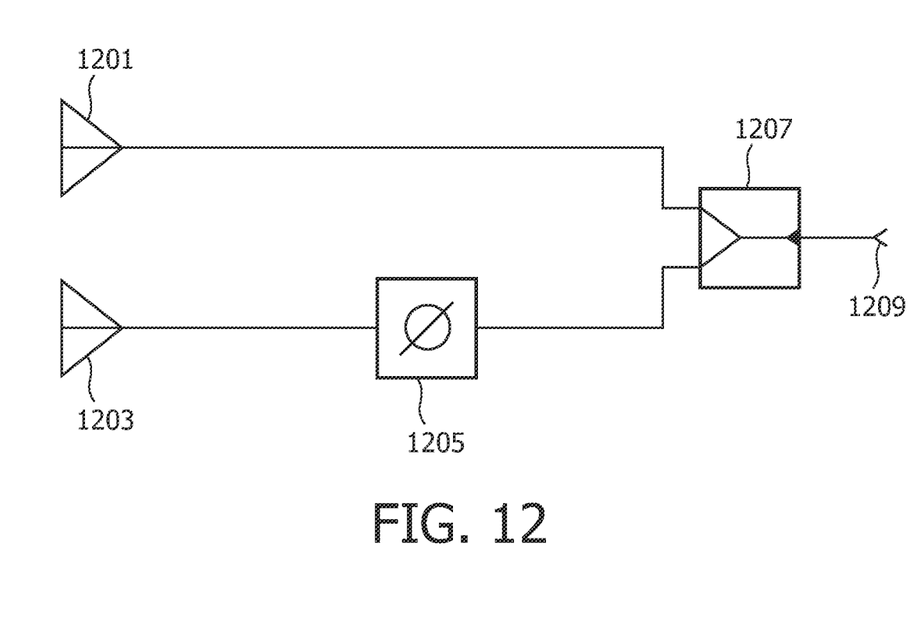
FIG. 12 shows an antenna array comprising two antennas.

FIG. 12 is a schematic view that shows, by way of example, an antenna array having at least two antennas 1201, 1203. It is however also possible for a larger number of antennas to be used. The radio-frequency power that is radiated is split into at least two in-phase antenna signals. The emission parameters of the two antenna signals may be differently weighted in this case. In one embodiment, one antenna signal may be delayed in relation to the other by means of a phase shifter 1205. The phase shifter 1205 itself is controlled by a processor or by a system for controlling the radio-frequency system by means of a microprocessor. By means of the phase shift, the phase shifter 1205 matches the orientation of the polar diagram of the antenna to the actual requirements that exist, such for example as on-body or off-body communications.

In a preferred embodiment, differently polarized antenna arrangements are used for the first antenna system 1201 and second antenna system 1203. In this way, a link for on-body communications can for example be made with a horizontally polarized antenna, whereas a link for off-body communications can be made by a vertically polarized antenna. In a further embodiment, vertically and horizontally oriented antennas may also be replaced by antennas giving dextrorotatory or levorotatory circular polarization.

In a preferred embodiment, a single antenna array may also be used as the first and second antenna systems, the feed of transmitted signals to a first group of the antennas taking place directly and the feed of transmitted signals to the second group of the antennas of the antenna array taking place with a phase shift. In this way, different polar diagrams for on-body and off-body communications can be produced with a single antenna array. The transceiver has a phase shifter 1205 for this purpose. An embodiment of this kind makes it possible for the polar diagram to be steered in a preferred direction. This is the embodiment that is preferred when the patient is walking around in the hospital while the sensors that he or she has attached to him or her are exchanging data with their surroundings.

Figure 13:
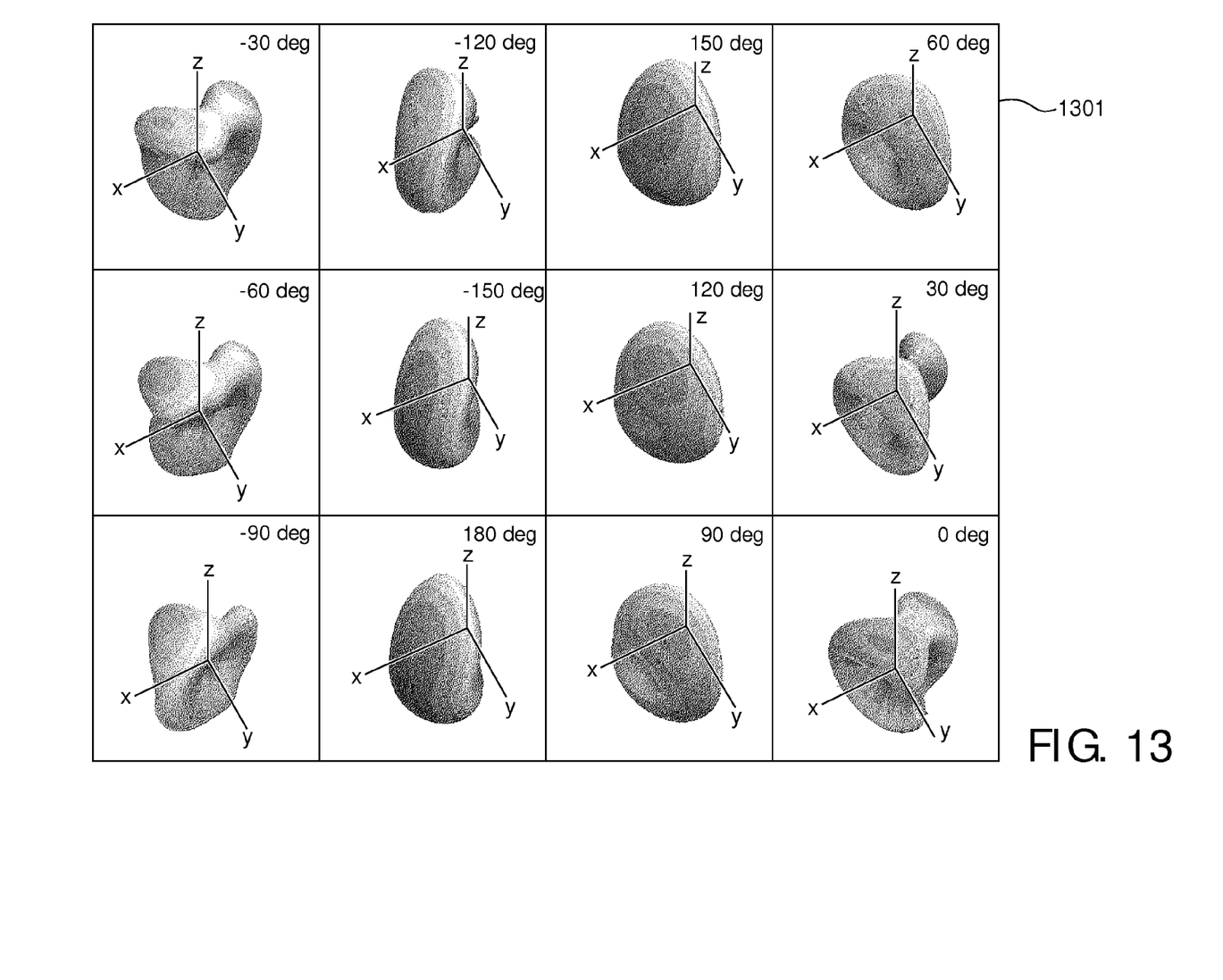
FIG. 13 shows possible emitted radiation from an antenna array as shown in FIG. 12.

FIG. 13 shows different polar diagrams 1301 for different phase shifts. Alternatively, it is also possible for use to be made of low-frequency antenna systems, such for example as capacitive RF antenna systems that are used for the on-body link. Arrangements of this kind use the human body as a capacitive electrical conductor.

The invention has been described and depicted in detail by means of the description and drawings but the description and drawings are to be considered merely illustrative and not limiting. The invention is not limited to the embodiments that have been disclosed.

Other variations on the embodiments disclosed may occur to the person skilled in the art when he or she is implementing them in practice or is studying the description or drawings or the accompanying claims. With regard to the claims, the word "comprising" does not exclude other, more wide-ranging, elements or steps. Nor does the indefinite article "a" or "an" exclude the plural. A single processor or one unit may perform a single one or a plurality of the functions mentioned in the claims. The mere fact that features appear in individual claims or in claims that are given independently of one another does not rule out the possibility that a combination of such features may also be used advantageously. A computer program can be stored or sold on a data-carrying medium, such for example as an optical storage medium or a semiconductor storage medium, that is supplied as a separate component or as an accessory to hardware. A computer program may also be distributed in different ways such for example as over the internet or via hard-wired or wireless telecommunications systems. The reference numerals in the claims are not to be considered as limiting the invention.

LIST OF REFERENCE NUMERALS

101 Sensor
103 Hub
105 Patient monitor
107 Patient information center
109 IEEE 802.15.4 short range radio
111 IEEE 802.11 mid range radio
201 Antenna system for on-body communications
203 Antenna system for off-body communications
205 Transceiver
207 Sensor
209 Processor
211 Memory
213 Switch
215 Antenna 1 for on-body communications
217 Antenna 2 for off-body communications
219 Transceiver device
301 Beacon payload or beacon
303 On-body communications
305 Off-body communications
307 Inactive period
309 Time slots
311 Superframe
313 Time
401 On-body contention access period (CAP)
403 Off-body contention access period (CAP)
501 On-body GTS 1
502 On-body GTS 2
503 On-body GTS 3
504 On-body GTS 4
505 Off-body GTS 1
506 Off-body GTS 2
507 Off-body GTS 3
601 On-body CAP
602 On-body GTS 1
603 On-body GTS 2
604 Off-body CAP
605 Off-body GTS 1
606 Off-body GTS 2
607 Off-body GTS 3
701 Time slot request
703 GTS specification
705 Content of GTS specification
707 Content of time slot request
801 Superframe request
803 GTS specification
805 Content of GTS specification
807 Content of superframe request
901 Beacon payload
903 Content of beacon payload
905 On-body radio traffic from user 2 to user 3
907 On-body radio traffic from user 4 to user 5
911 Off-body radio traffic from user 2 to user 1
913 Off-body radio traffic from user 3 to user 1
915 Off-body radio traffic from user 5 to user 1
1001 Polar diagram
1101 Polar diagram
1201 Antenna system 1
1203 Antenna system 2
1205 Phase shifter (0 to 360°)
1207 Signal splitter
1209 Radio frequency input
1301 Polar diagrams

The invention claimed is:

1. A transceiver device for processing a medium access control (MAC) protocol, said transceiver device comprising:
a first antenna system configured for on-body communications;
a second antenna system configured for off-body communications;
a transceiver configured for transmitting or receiving data payloads using the MAC protocol over a communications link with a body area network (BAN), each data payload being transmitted or received over the communications link using a corresponding one of the first and second antenna systems allocated to the data payload; and
a controller configured to:
allocate the first antenna system to the transceiver for an interval of time occupied by a data payload configured for on-body communications;
allocate the second antenna system to the transceiver for an interval of time occupied by a data payload configured for off-body communications; and
allocate a first time slot of a superframe for only on-body communications and a second time slot of the superframe for only off-body communications by specifically designating the first and second time slots for only on-body and off-body communications, respectively, in a beacon of the superframe.

2. The transceiver device as claimed in claim 1, wherein the transceiver device is a network coordinator for the BAN, and wherein the controller is further configured to:
synchronize the data payloads between transceiver devices of the BAN by adding a beacon payload to a superframe.

3. The transceiver device as claimed in claim 2, wherein the network coordinator is configured to be arranged on-body, and wherein the controller is configured to:
emit the beacon payload in parallel with the first and second antenna systems.

4. The transceiver device as claimed in claim 1, wherein the controller is further configured to:
receive a request for a time slot to be used for communications with an on-body or off-body device from a requesting transceiver device of the BAN; and
grant the requesting transceiver device a right of use of a time slot with a beacon payload.

5. The transceiver device as claimed in claim 1, wherein the controller is further configured to:
allocate time slots to transceiver devices of the BAN in the form of contention access periods or in the form of guaranteed time slots, in a superframe.

6. The transceiver device as claimed in claim 1, wherein the transceiver device includes a converter and further includes a third antenna system, wherein the controller is further configured to:
exchange data between the third antenna system and one of the first and second antenna systems, the third antenna system configured to be used with a communications protocol different than a communications protocol used with the first and second antenna systems.

7. The transceiver device as claimed in claim 1, wherein the controller is further configured to:
allocate the first antenna system to the transceiver for the interval of time occupied by a medical data payload reserved for on-body communications; and allocate the second antenna system to the transceiver for the interval of time occupied by a medical data payload reserved for off-body communications.

8. The transceiver device as claimed in claim 1, wherein the transceiver is configured to communicate with the BAN over the communications link using both the first antenna system and the second antenna system.

9. The transceiver device as claimed in claim 1, wherein each data payload is configured to be transmitted or received over the communications link using a time slot specifically designated for use with only one of on-body communications and off-body communications in a beacon payload of a superframe including the time slot.

10. The transceiver device as claimed in claim 1, wherein polar diagrams of the first and second antenna systems are optimized for on-body and off-body communications, respectively.

11. A system for wireless communications using a medium access control (MAC) protocol, said system comprising:
one or more transceiver devices configured to communicate with each other to define a body area network (BAN), each transceiver device including:
a first antenna system configured for on-body communications;
a second antenna system configured for off-body communications;
a transceiver configured for transmitting or receiving medical data payloads using the MAC protocol over a communications link with the BAN, each medical data payload being transmitted or received over the communications link using a corresponding one of the first and second antenna systems allocated to the medical data payload;
a controller configured to:
allocate the first antenna system to the transceiver for transmission or reception of on-body, medical data payloads;
allocate the second antenna system to the transceiver for transmission or reception of off-body, medical data payloads; and
allocate a first time slot of a superframe for only on-body communications and a second time slot of the superframe for only off-body communications by specifically designating the first and second time slots for only on-body and off-body communications, respectively, in a beacon of the superframe.

12. The system as claimed in claim 11, wherein the system further includes:
a converter being one of the one or more transceiver devices and further including a third antenna system, wherein the controller of the converter is further configured to convert data between a radio link standard used with the first and second antenna systems and another radio link standard used with the third antenna system.

13. The system as claimed in claim 11, wherein the system further includes:
a network coordinator being the one of the transceiver devices added to the BAN first.

14. The system as claimed in claim 11, wherein one of the transceiver devices includes a sensor configured to be mounted on a body of a subject, and wherein the controller of the one transceiver device is further configured to exchange data between the sensor and a patient information center via:
an off-body communications link with a patient monitor, the patient monitor being configured to relay the data to the patient information center; or
an on-body communications link to a converter of the BAN, the converter being configured to relay the data to the patient information center using a third antenna system.

15. The system as claimed in claim 11, wherein each data payload is transmitted or received over the communications link using a time slot specifically designated for use with only one of on-body communications and off-body communications in a beacon payload of a superframe including the time slot.

16. The system as claimed in claim 11, wherein the transceiver communicates with the BAN over the communications link using both the first antenna system and the second antenna system.

17. A method for wireless communications over a body area network (BAN), said method comprising:
dividing a communications channel of the BAN into superframes that follow one another in time at a medium access control (MAC) layer, one of the superframes including:
a beacon payload designating which times slots of the one superframe are for on-body communications and which time slots of the one superframe are for off-body communications;
a first time slot allocated for only on-body communications; and
a second time slot allocated for only off-body communications;
synchronizing transceiver devices of the BAN with the beacon payload;
allocating the first time slot for only on-body communications and the second time slot for only off-body communications by specifically designating the first and second time slots for only on-body and off-body communications, respectively, in the beacon payload;
transmitting or receiving a data payload for on-body communications over a time slot of the one superframe using a transceiver allocated a first antenna system optimized for on-body communications, the time slot allocated for on-body communications; and
transmitting or receiving a data payload for off-body communications over a time slot of the one superframe using the transceiver allocated a second antenna system optimized for off-body communications, the time slot allocated for off-body communications.

18. The method as claimed in claim 17, further including:
allocating times slots of the one super frame to transceiver devices of the BAN by a network coordinator of the BAN, each time slot allocated for only one of off-body communications and on-body communications.

19. The method as claimed in claim 17, further including:
converting data between a communications protocol used with the first and second antenna systems and another communications protocol used with a third antenna system.

* * * * *